United States Patent
Kwon et al.

(10) Patent No.: US 7,558,026 B2
(45) Date of Patent: Jul. 7, 2009

(54) METHOD AND APPARATUS FOR A SINGLE PIEZOELECTRIC MICRO-ACTUATOR IN A HEAD GIMBAL ASSEMBLY OF A HARD DISK DRIVE

(75) Inventors: Haesung Kwon, San Jose, CA (US); Dong Jun Lee, Sunnyvale, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 450 days.

(21) Appl. No.: 11/454,107

(22) Filed: Jun. 14, 2006

(65) Prior Publication Data

US 2007/0291418 A1    Dec. 20, 2007

(51) Int. Cl.
*G11B 5/56* (2006.01)

(52) U.S. Cl. .................................... 360/294.4

(58) Field of Classification Search .............. 360/294.4, 360/245.4, 245.3, 264.2, 234.5, 294.3, 244.2, 360/236.5, 244.5, 244.8
See application file for complete search history.

(56) References Cited

U.S. PATENT DOCUMENTS

| | | | |
|---|---|---|---|
| 5,189,578 A | 2/1993 | Mori et al. | |
| 5,276,573 A | 1/1994 | Harada et al. | |
| 5,282,190 A | 1/1994 | Maruo et al. | |
| 5,745,319 A | 4/1998 | Takekado et al. | |
| 5,757,573 A | 5/1998 | Tokuyama et al. | |
| 5,764,444 A | 6/1998 | Imamura et al. | |
| 5,802,914 A | 9/1998 | Fassler et al. | |
| 5,805,381 A | 9/1998 | Resh | |
| 5,943,189 A | 8/1999 | Boutaghou et al. | |
| 6,188,548 B1 | 2/2001 | Khan et al. | |
| 6,246,552 B1 | 6/2001 | Soeno et al. | |
| 6,268,983 B1 | 7/2001 | Imada et al. | |
| 6,275,454 B1 | 8/2001 | Boutaghou | |
| 6,297,936 B1 * | 10/2001 | Kant et al. ............... 360/294.4 |
| 6,320,730 B1 * | 11/2001 | Stefansky et al. ........ 360/294.4 |
| 6,362,933 B1 | 3/2002 | Sampietro et al. | |
| 6,429,999 B1 * | 8/2002 | Dague et al. ............. 360/97.01 |
| 6,501,625 B1 | 12/2002 | Boismeir et al. | |
| 6,545,846 B1 | 4/2003 | Chee et al. | |
| 6,570,730 B1 | 5/2003 | Lewis et al. | |
| 6,590,748 B2 | 7/2003 | Murphy et al. | |
| 6,611,399 B1 | 8/2003 | Mei et al. | |
| 6,671,131 B2 * | 12/2003 | Kasajima et al. ......... 360/294.4 |
| 6,950,266 B1 | 9/2005 | McCaslin et al. | |

(Continued)

*Primary Examiner*—Allen T Cao
(74) *Attorney, Agent, or Firm*—Earle Jennings; GSS Law Group

(57) ABSTRACT

A slider cradle for lateral positioning slider near rotating disk surface in hard disk drive, consisting essentially of piezoelectric micro-actuator coupling to slider cradle blank, further including piezoelectric micro-actuator coupling to first slider mount arm near slider mount and near slider mount base. A head gimbal assembly including slider cradle coupling to slider, flexure finger, and flexure finger electrically coupling to piezoelectric contacts. An actuator arm coupling to at least one head gimbal assembly. An actuator assembly, comprising voice coil coupling to at least one actuator arm. A hard disk drive containing actuator assembly. The invention includes a method of making slider cradle blank and slider cradle. The products of this process. Making head gimbal assembly, actuator assembly and hard disk drive using the invention's components. The head gimbal assembly, the actuator assembly, and the hard disk drive are products of these processes.

17 Claims, 4 Drawing Sheets

U.S. PATENT DOCUMENTS

| | | | |
|---|---|---|---|
| 7,072,144 B2* | 7/2006 | Arya | 360/234.6 |
| 2002/0141117 A1* | 10/2002 | Kasajima et al. | 360/294.4 |
| 2005/0152072 A1 | 7/2005 | Kwon et al. | |
| 2006/0044681 A1* | 3/2006 | Le et al. | 360/126 |
| 2006/0139802 A1* | 6/2006 | Sasaki et al. | 360/126 |
| 2006/0164763 A1* | 7/2006 | Yao et al. | 360/294.4 |
| 2006/0168603 A1* | 7/2006 | Goto | 720/619 |
| 2006/0171080 A1* | 8/2006 | Yamaguchi | 360/294.4 |
| 2007/0000110 A1* | 1/2007 | Yao | 29/25.35 |
| 2007/0165333 A1* | 7/2007 | Kwon et al. | 360/294.4 |
| 2007/0263326 A1* | 11/2007 | Strom et al. | 360/294.4 |
| 2008/0148301 A1* | 6/2008 | Masaoka et al. | 720/601 |
| 2008/0184278 A1* | 7/2008 | Leigh et al. | 720/601 |

* cited by examiner

METHOD AND APPARATUS FOR A SINGLE PIEZOELECTRIC MICRO-ACTUATOR IN A HEAD GIMBAL ASSEMBLY OF A HARD DISK DRIVE

TECHNICAL FIELD

This invention relates to hard disk drive components, in particular, to piezoelectric micro-actuators for fine positioning a coupled slider within a head gimbal assembly.

BACKGROUND OF THE INVENTION

Contemporary hard disk drives include an actuator assembly pivoting through an actuator pivot to position one or more read-write heads, embedded in sliders over a rotating disk surfaces. The data stored on the rotating disk surface is typically arranged in concentric tracks collectively referred to as the data region. To access the data of a track, a servo controller first positions the read-write head by electrically stimulating the voice coil motor, which couples through the voice coil and an actuator arm to move a head gimbal assembly in positioning the slider close to the track. This process is often referred to as a track seeking process. Once the slider and its embedded read-write head are close to the track a second process known as a track following process takes over the control of positioning the read-write head to access the track.

In the last few years, hard disk drives have begun to incorporate the use of micro-actuators to further control the lateral position of the read-write head during the track following process. These micro-actuators have tended to be a pair of piezoelectric micro-actuators, located on perpendicular sides of the slider to the side closest to the read-write head. The use of dual piezoelectric micro-actuators has been preferred because it increased the stroke sensitivity, or lateral variation delivered to the slider for similar potential differences. The high stroke sensitivity has been required, due to the track pitch of contemporary hard disk drives. While these existing dual piezoelectric micro-actuators work, they are inherently more expensive to build than a micro-actuator involving just one piezoelectric component. What is needed is a single piezoelectric micro-actuator delivering enough stroke sensitivity to meet the requirements for track following in a hard disk drive.

SUMMARY OF THE INVENTION

The inventors realized that for hard disk drives with data densities above about 150 Gigabits per square inch, the track pitch becomes at most 169 nanometers (nm), and the stroke sensitivity requirement becomes at most 80 nm. In such situations, only one piezoelectric micro-actuator is required to deliver the stroke sensitivity and a significant cost reduction is achieved. The overall mass required of the head gimbal assembly is also reduced.

The invention includes a slider cradle for lateral positioning of a slider near a rotating disk surface in a hard disk drive. The slider cradle consists essentially of a single piezoelectric micro-actuator coupling to a slider cradle blank. This coupling further includes the piezoelectric micro-actuator coupling to a first slider mount arm near a slider mount and near a slider mount base. The piezoelectric micro-actuator includes a first piezoelectric contact and a second piezoelectric contact. The slider cradle blank includes the first and second slider mount arms both coupling to a slider mount base and to a slider mount.

The piezoelectric micro-actuator may consist essentially of a multilayer piezoelectric material coupled between the first piezoelectric contact and the second piezoelectric contact. The multilayer piezoelectric material may be comprised of N layers of piezoelectric materials, where N is at most five, and may preferably be at most three.

The piezoelectric micro-actuator may form a mode D31 piezoelectric structure. Such structures may include the first and second piezoelectric contacts electrically coupling to two metallic layers separated by a multilayer piezoelectric material. Alternatively, the piezoelectric micro-actuator may form a mode D33 piezoelectric structure.

The invention includes a head gimbal assembly. The head gimbal assembly includes the slider cradle coupling through the slider mount to the slider, the slider mount base coupling to a flexure finger, and the flexure finger electrically coupling to the first and second piezoelectric contacts. The invention includes an actuator arm coupling to at least one of the head gimbal assemblies. The actuator arm may sometimes preferably couple to two of the head gimbal assemblies. The invention includes an actuator assembly, comprising a voice coil coupling to at least one of the actuator arms. The invention includes a hard disk drive containing the actuator assembly.

The invention includes a method of making the slider cradle. A sheet of metal is die-stamped to create the slider cradle blank. The piezoelectric micro-actuator is mounted on the slider cradle blank to create the slider cradle. The slider cradle blank and the slider cradle are products of this process.

Making a head gimbal assembly using the invention's slider cradle includes coupling the slider cradle through the slider mount to a slider, coupling the slider mount base to a flexure finger, and electrically coupling the flexure finger to the first and second piezoelectric contacts of the piezoelectric micro-actuator. Making an actuator assembly using the head gimbal assembly includes coupling at least one actuator arm to at least one of the head gimbal assemblies. Making a hard disk drive using the actuator assembly includes attaching the actuator assembly through an actuator pivot to a disk base. The head gimbal assembly, the actuator assembly, and the hard disk drive are products of these processes.

DETAILED DESCRIPTION

This invention relates to hard disk drive components, in particular, to piezoelectric micro-actuators for fine positioning a coupled slider within a head gimbal assembly.

The inventors realized that for hard disk drives with data densities above about 150 Gigabits per square inch, the track pitch becomes at most 169 nanometers (nm), and the stroke sensitivity requirement becomes at most 80 nm. In such situations, only one piezoelectric micro-actuator is required to deliver the stroke sensitivity and a significant cost reduction is achieved. The overall mass required of the head gimbal assembly is also reduced.

The invention includes a slider cradle for lateral positioning of a slider near a rotating disk surface in a hard disk drive. The slider cradle consists essentially of a single piezoelectric micro-actuator coupling to a slider cradle blank.

Figure 1A:
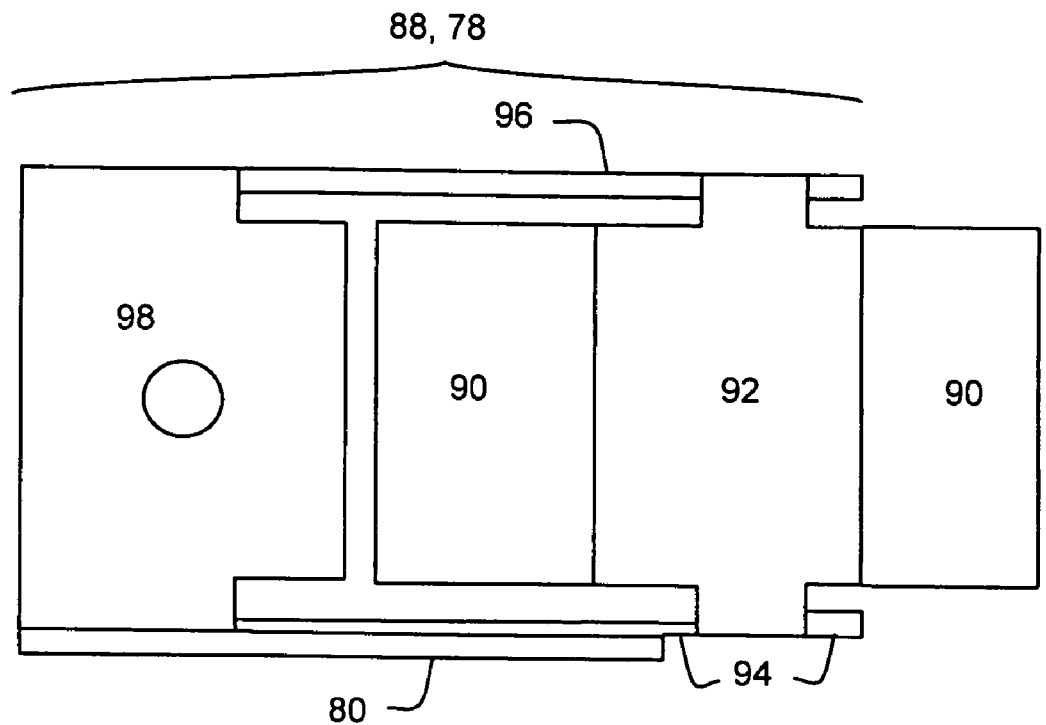
FIG. 1A shows the slider cradle of the invention coupled with a slider.
Figure 1B:
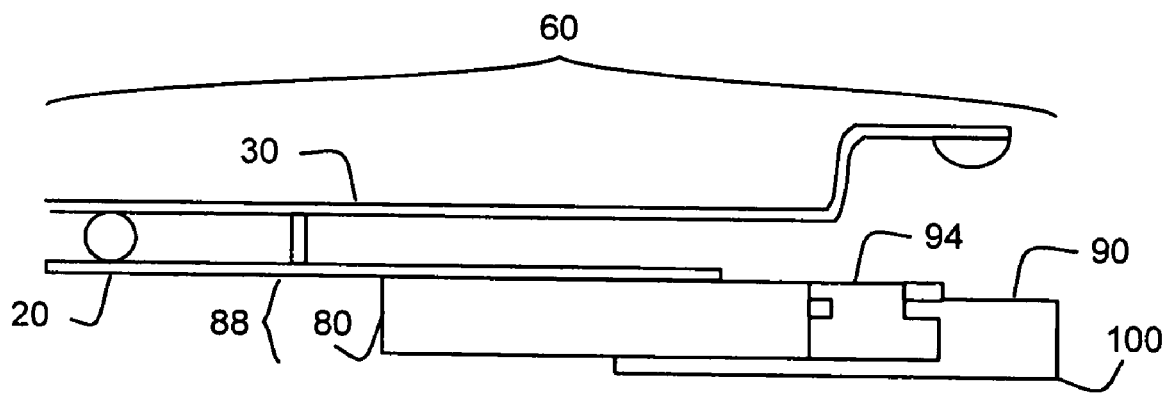
FIG. 1B shows some details of a head gimbal assembly including the slider cradle and the slider of FIG. 1A, with a flexure finger and load beam.
Figure 1C:
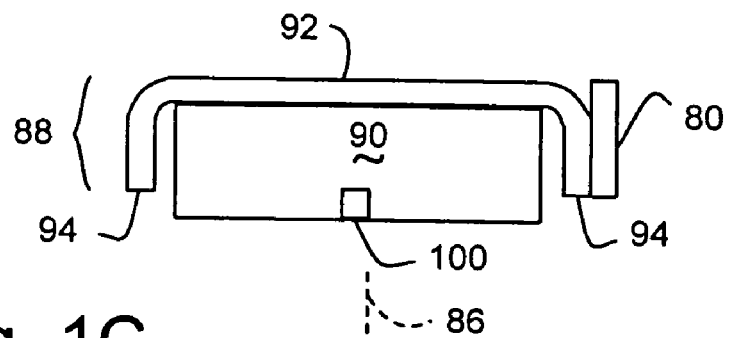
FIG. 1C shows the front view of the slider cradle and slider of FIG. 1A including a read-write head, offset from the center of the slider cradle.
Figure 2A:
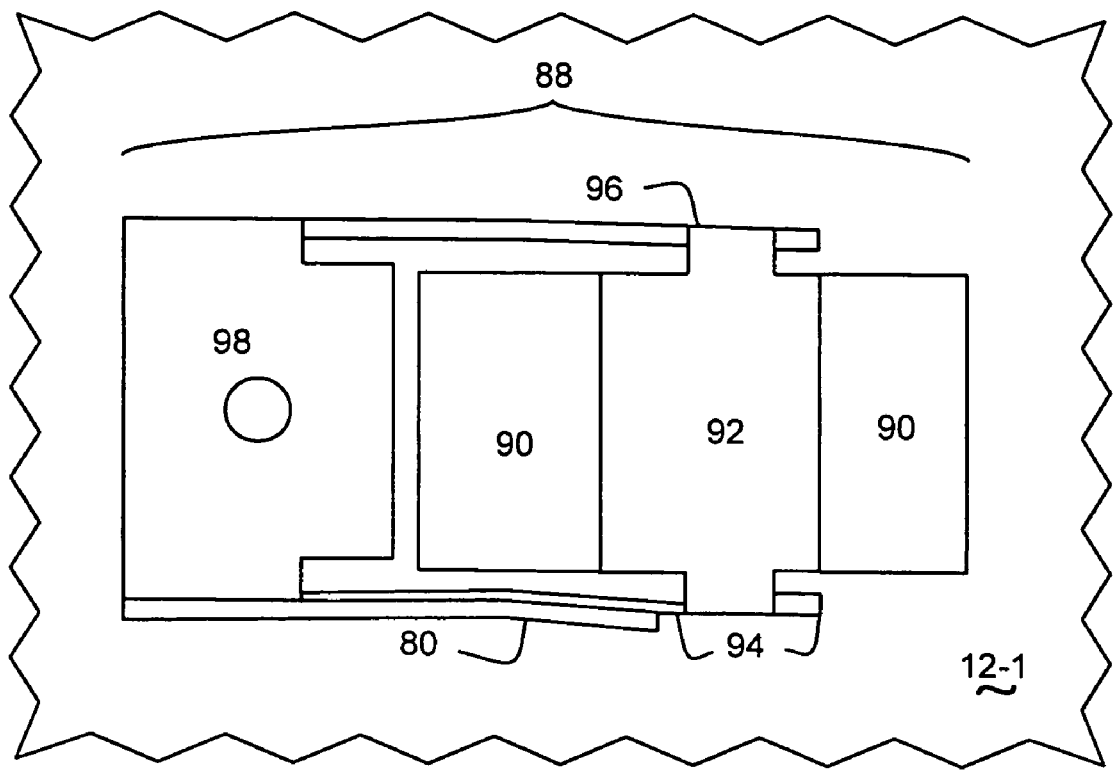
FIGS. 2A and 2B show the slider cradle of FIG. 1A to 1C providing a lateral motion to the slider over the rotating disk surface.
Figure 2B:
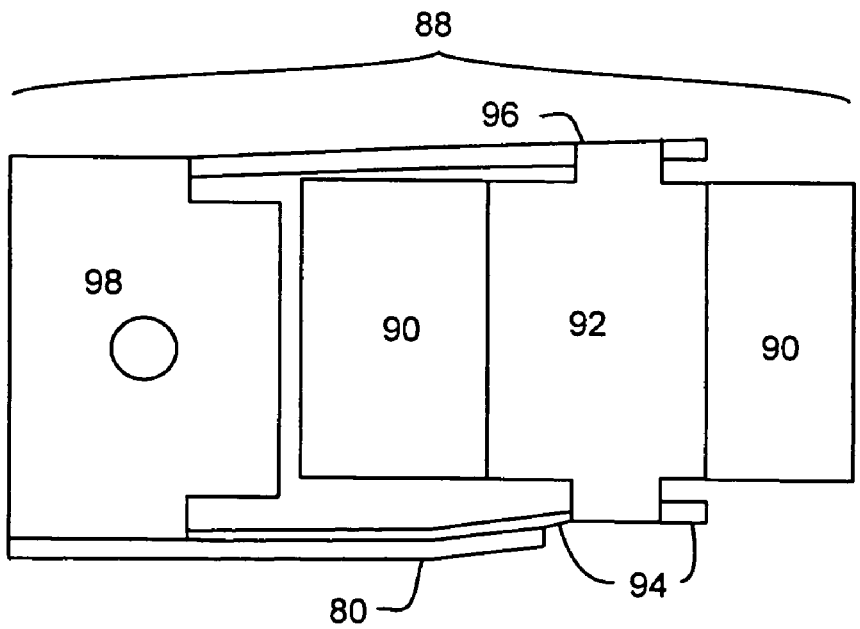
Figure 3A:
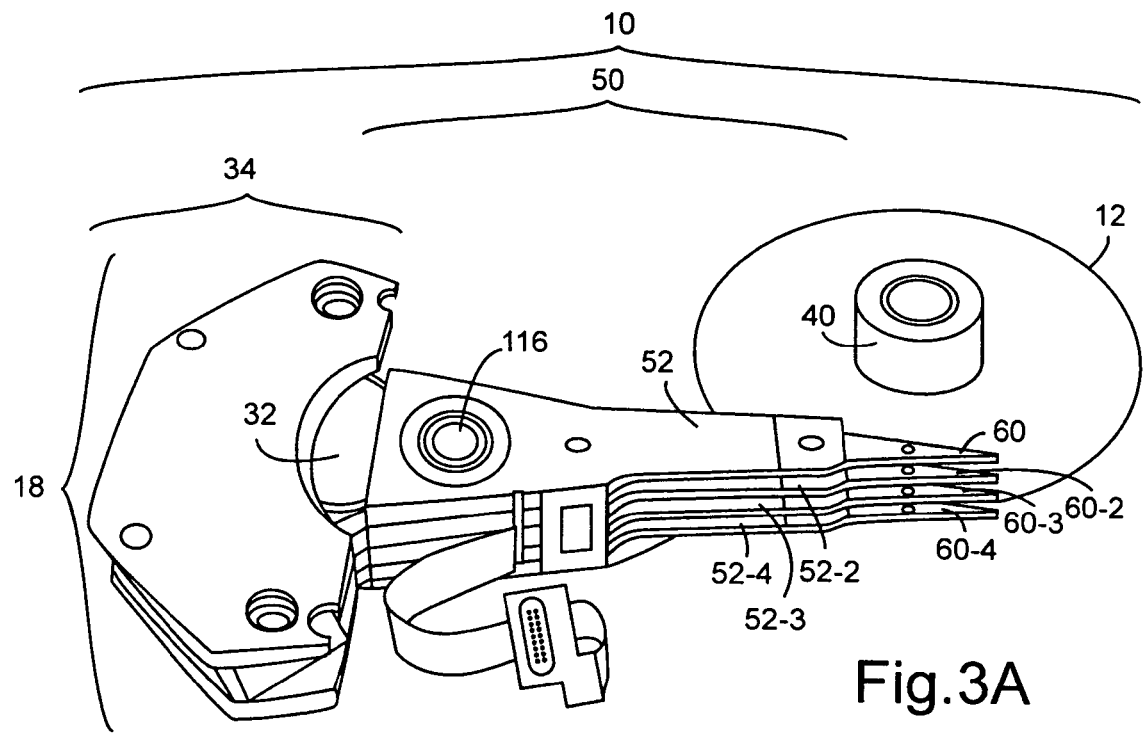
FIGS. 3A and 3B shows various aspects of a hard disk drive, including an actuator arm coupling to the head gimbal assembly of FIG. 1B.
Figure 3B:
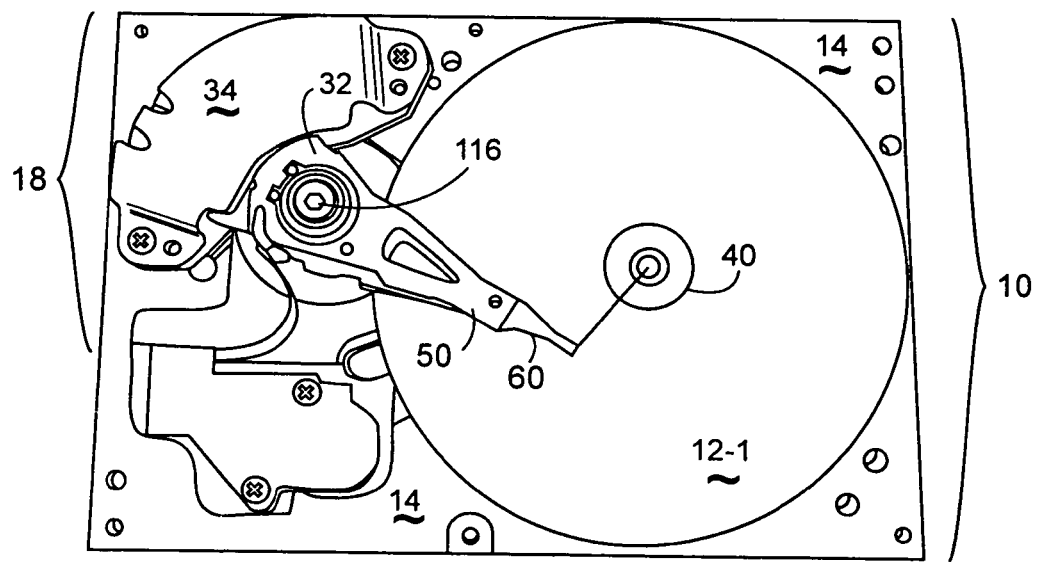
Figure 4A:
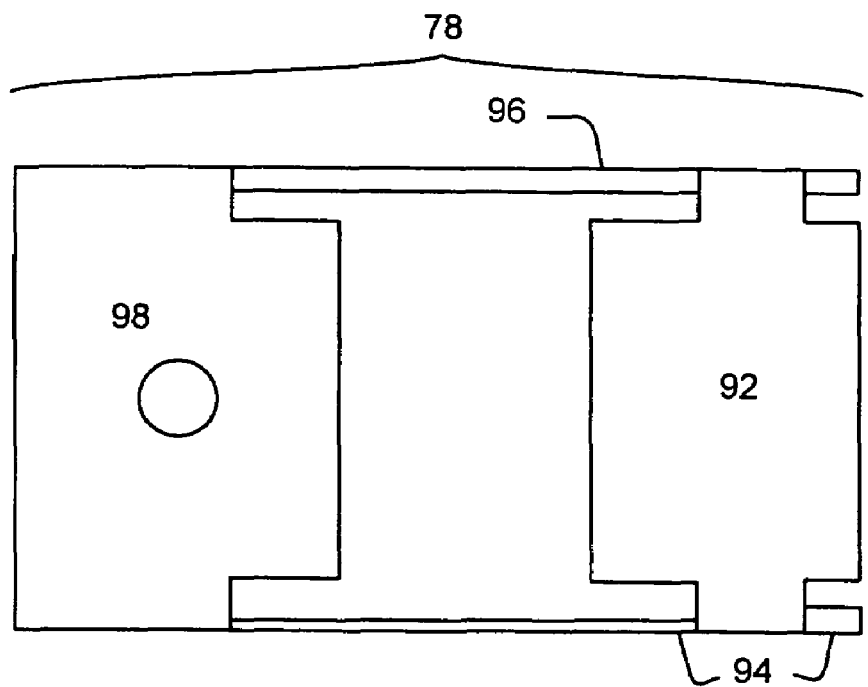
FIGS. 4A to 4C show the top, side and front views of the slider blank used in the slider cradle of FIGS. 1A to 1C.
Figure 4B:
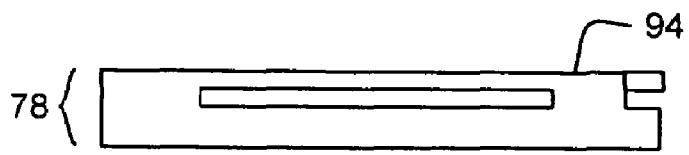
Figure 4C:
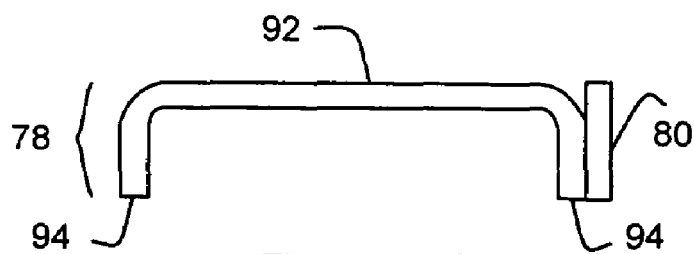
Figure 4D:
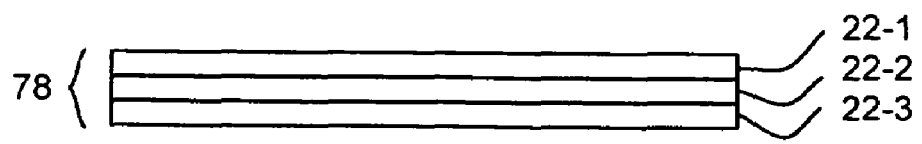
FIG. 4D shows the piezoelectric micro-actuator of FIG. 1A to 2B as an N layer piezoelectric device, where N is three.

The slider cradle 88 shown in FIGS. 1A to 2B is used in a head gimbal assembly 60 for lateral positioning of a slider 90 near a rotating disk surface 12-1 in a hard disk drive 10 as shown in FIG. 3B. The slider cradle consists essentially of a single piezoelectric micro-actuator 80 coupling to a slider cradle blank 78 as shown in FIGS. 4A to 4C. This coupling further includes the piezoelectric micro-actuator coupling to a first slider mount arm 94 near a slider mount 92 and near a slider mount base 98. The piezoelectric micro-actuator includes a first piezoelectric contact 82 and a second piezoelectric contact 84. The slider cradle blank includes the first and second slider mount arms both coupling to a slider mount base and to a slider mount.

The piezoelectric micro-actuator 80 may consist essentially of a multilayer piezoelectric material coupled between the first piezoelectric contact 82 and the second piezoelectric contact 84. The multilayer piezoelectric material may be comprised of N layers of piezoelectric materials, where N is at most five, and may preferably be at most three.

The piezoelectric micro-actuator 80 may form a mode D31 piezoelectric structure. Such structures may include the first and second piezoelectric contacts electrically coupling to two metallic layers separated by a multilayer piezoelectric material. Alternatively, the piezoelectric micro-actuator may form a mode D33 piezoelectric structure. The relative displacement in the D33 mode is about three times greater than in the D31 mode. A D33 mode piezoelectric micro-actuator is typically composed of a stack of piezoelectric components. Displacement in the D33 mode is an expansion in the same direction as both the electric field and the poling direction. D33 mode actuators provide a linear motion. A D31 mode actuator acts by contracting perpendicular to the electric field and the poling direction.

The D33 mode piezoelectric micro-actuators are more commonly seen in industrial applications. They use the expansion of the active material, in D33 mode to produce a displacement. Typically, the active part of these micro-actuators includes a stack of ceramic layers ranging in thickness between 20 to 100 micrometers ($\mu$m), separated by thin, uniformly sized and shaped metallic layers known herein as electrodes. The micro-actuator deformation is often 0.15% (15 $\mu$m/cm) of the total unit size.

The D31 mode micro-actuators use the contraction of the active material, in the D31 mode, to produce a negative displacement. The active material of these micro-actuators also includes ceramic layers separated by thin metallic layers. However these D31 mode micro-actuators displace perpendicular to the electric field and the poling direction, with the displacement being a function of the length of the actuator, with the number of parallel layers determining the stiffness of these piezoelectric micro-actuators. These micro-actuators can and do bend.

Piezoelectric composite materials often include lead, zirconium, and tungsten. The piezoelectric effect generates a mechanical action through the application of electric power by applying a potential difference between the piezoelectric contact. FIGS. 1A and 1C show the relative configuration of the slider 90 in the slider cradle 88 when there is essentially no potential difference between the first piezoelectric contact 82 and the second piezoelectric contact 84 of the piezoelectric micro-actuator 80. Note that the read-write head 100 is offset from the slider cradle center 86. FIG. 2A shows the piezoelectric micro-actuator responding to a potential difference applied between its first and second piezoelectric contacts, causing lateral motion near the rotating disk surface 12-1. In certain embodiments, such as those in which the piezoelectric micro-actuator implements a mode D31 piezoelectric structure, the piezoelectric micro-actuator responding to the negative of the potential difference applied in FIG. 2A causes lateral motion such as shown in FIG. 2B. In some embodiments of the invention, only one of the lateral motions shown in FIGS. 2A and 2B may be supported by the piezoelectric micro-actuator 80.

The invention includes a head gimbal assembly 60 using the slider cradle 88. The head gimbal assembly includes the slider cradle coupling through the slider mount 92 to the slider 90, the slider mount base 98 coupling to a flexure finger 20, and the flexure finger electrically coupling to the first piezoelectric contact 82 and second piezoelectric contact 84.

The invention includes an actuator arm 52 coupling to at least one head gimbal assembly 60. The actuator arm may sometimes preferably couple to two of the head gimbal assemblies. The invention includes an actuator assembly 50, comprising a voice coil 32 coupling to at least one actuator arm 52. The invention includes a hard disk drive 10 containing the actuator assembly 50.

The invention includes a method of making the slider cradle. A sheet of metal is die-stamped to create the slider cradle blank. The piezoelectric micro-actuator is mounted on the slider cradle blank to create the slider cradle. The slider cradle blank and the slider cradle are products of this process.

Making the head gimbal assembly 60 using the invention's slider cradle 88 includes the following. Coupling the slider cradle 88 through the slider mount 92 to a slider 90. Coupling the slider mount base 98 to a flexure finger 20. And electrically coupling the flexure finger 20 to the first piezoelectric contact 82 and the second piezoelectric contact 84 of the piezoelectric micro-actuator 80.

Making an actuator assembly 50 using the head gimbal assembly 60 includes coupling at least one actuator arm 52 to at least one head gimbal assembly 60. Making a hard disk drive 10 using the actuator assembly 50 includes attaching the actuator assembly through an actuator pivot 116 to a disk base 14. The head gimbal assembly, the actuator assembly, and the hard disk drive are products of these processes.

The preceding embodiments provide examples of the invention and are not meant to constrain the scope of the following claims.

What is claimed is:

1. A slider cradle for lateral positioning of a slider near a rotating disk surface in a hard disk drive, consisting essentially of:
   a piezoelectric micro-actuator coupling a slider cradle blank, further comprising:
   said piezoelectric micro-actuator coupling to a first slider mount arm near a slider mount and near a slider mount base; wherein said piezoelectric micro-actuator, includes: a first piezoelectric contact and a second piezoelectric contact;
   wherein said slider cradle blank, includes:
   said first slider mount arm coupling to said slider mount base and coupling to said slider mount; and said second slider mount arm coupling to said slider mount base and coupling to said slider mount;

wherein said hard disk drive requires said piezoelectric micro-actuator to have a stroke sensitivity, for said lateral positioning of said slider, of at most 80 nanometers for following a track on said rotating disk surface.

2. The slider cradle of claim 1,
wherein said piezoelectric micro-actuator consists essentially of: a bulk piezoelectric material coupled between said first piezoelectric contact and said second piezoelectric contact.

3. The slider cradle of claim 2, wherein said bulk piezoelectric material is comprised of N layers of piezoelectric materials; wherein N is at most 5.

4. The slider cradle of claim 3, wherein said N is at most 3.

5. The slider cradle of claim 1, wherein said piezoelectric micro-actuator forms a mode D31 piezoelectric structure.

6. The slider cradle of claim 1, wherein said piezoelectric micro-actuator forms a mode D33 piezoelectric structure.

7. A head gimbal assembly for holding said slider of claim 1, comprising:
said slider cradle coupling through said slider mount to said slider;
said slider mount base coupling to a flexure finger; and
said flexure finger electrically coupling to said first piezoelectric contact and to said second piezoelectric contact.

8. An actuator arm coupling to at least one of said head gimbal assembly of claim 7.

9. The actuator arm of claim 8, coupling to two of said head gimbal assemblies.

10. An actuator assembly, comprising: a voice coil coupling to at least one of actuator arms of claim 8.

11. A hard disk drive, comprising: said actuator assembly of claim 10.

12. A method of making said slider cradle of claim 1, comprising the steps:
die-stamping a sheet of metal to create a slider cradle blank; and
mounting said piezoelectric micro-actuator to said slider cradle blank to create said slider cradle.

13. The slider cradle blank and the slider cradle, as products of the process of claim 12.

14. A method of making a head gimbal assembly from said slider cradle of claim 13, comprising the steps:
using said slider cradle, a slider, and a flexure finger to create said head gimbal assembly, further comprising the steps:
coupling said slider cradle through said slider mount to a slider;
coupling said slider mount base to a flexure finger; and
electrically coupling said flexure finger to said first piezoelectric contact and to said second piezoelectric contact.

15. The head gimbal assembly, as a product of the process of claim 14.

16. A method of making an actuator assembly, comprising the step:
coupling at least one actuator arm to at least one of said head gimbal assemblies of claim 15.

17. The actuator assembly, as a product of the process of claim 16.

* * * * *